(12) United States Patent
Tanimura

(10) Patent No.: US 9,571,224 B2
(45) Date of Patent: Feb. 14, 2017

(54) TRANSMISSION DEVICE, RECEIVING DEVICE, AND COMMUNICATION METHOD

(71) Applicant: FUJITSU LIMITED, Kawasaki-shi, Kanagawa (JP)

(72) Inventor: Takahito Tanimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/924,191

(22) Filed: Oct. 27, 2015

(65) Prior Publication Data

US 2016/0149666 A1 May 26, 2016

(30) Foreign Application Priority Data

Nov. 26, 2014 (JP) ................... 2014-238576

(51) Int. Cl.
*H04B 10/112* (2013.01)
*H04J 14/06* (2006.01)
*H04B 10/25* (2013.01)

(52) U.S. Cl.
CPC ............. *H04J 14/06* (2013.01); *H04B 10/112* (2013.01); *H04B 10/25* (2013.01)

(58) Field of Classification Search
CPC .................................................. H04B 10/112
See application file for complete search history.

(56) References Cited

U.S. PATENT DOCUMENTS

| | | | |
|---|---|---|---|
| 5,754,322 A | 5/1998 | Ishikawa et al. | |
| 7,580,632 B1 | 8/2009 | Feuer et al. | |
| 2002/0048062 A1 | 4/2002 | Sakamoto et al. | |
| 2002/0063934 A1 | 5/2002 | Sakauchi | |
| 2006/0239630 A1* | 10/2006 | Hase | H04B 10/25759 385/147 |
| 2014/0079391 A1* | 3/2014 | Kim | H04B 10/532 398/30 |

FOREIGN PATENT DOCUMENTS

| | | |
|---|---|---|
| JP | 2002-57624 | 2/2002 |
| JP | 2002-164846 | 6/2002 |
| JP | 2005-223944 | 8/2005 |

OTHER PUBLICATIONS

Zhao et al., "Circle Polarization Shift Keying With Direct Detection for Free-Space Optical Communication", *Journal of Optical Communications and Networking*, Sep. 2009, pp. 307-312, vol. 1, No. 4.
Feuer et al., "Digital Lightpath Label Transcoding for Dual-Polarization QPSK Systems", OFC/NFOEC 2011, JWA28.

* cited by examiner

*Primary Examiner* — Shi K Li
(74) *Attorney, Agent, or Firm* — Staas & Halsey LLP

(57) ABSTRACT

An apparatus which transmits data and control information which indicates at least one of a demodulation method and a decoding method of the data using an optical signal, includes: a modulator configured to perform modulation in which a rate of change of a polarization state of light is changed according to the control information, and modulation in which a characteristic of light which is different from the rate of change of the polarization state is changed in accordance with the data; and an emitting section configured to emit light, on which modulation is performed using the modulator, to another communication apparatus via a free space.

9 Claims, 12 Drawing Sheets

TRANSMISSION DEVICE, RECEIVING DEVICE, AND COMMUNICATION METHOD

CROSS-REFERENCE TO RELATED APPLICATION

This application is based upon and claims the benefit of priority of the prior Japanese Patent Application No. 2014-238576, filed on Nov. 26, 2014, the entire contents of which are incorporated herein by reference.

FIELD

The embodiments discussed herein are related to a transmission device, a receiving device, and a communication method.

BACKGROUND

Japanese Laid-open Patent Publication No. 2005-223944, for example, discusses an optical transmission system in which, in communication which uses optical fiber, control information is transmitted by adding an overhead bit to a main signal, and the main signal is demodulated at the reception side. In addition, U.S. Pat. No. 7,580,632, for example, discusses a method in which, in communication which uses optical fiber, a data signal and a path identification (ID) are transmitted by performing modulation using a tone according to the path ID with respect to an optical data signal.

In addition, Xinhui Zhao, Yong Yao, Yunxu Sun, and Chao Liu, "Circle Polarization Shift Keying With Direct Detection for Free-Space Optical Communication", Journal of Optical Communications and Networking, Vol. 1, Issue 4, Sep. 1, 2009, pp. 307-312, for example, discusses a method in which, in free space optical communication, information is detected using a reception side polarization beam splitter by carrying information, which is different from a main signal, on the polarization wave itself by changing the status of polarization (polarization state) of single polarization. In addition, Mark D. Feuer, Vinay A. Vaishampayan, V. Mikhailov, and P. Westbrook, "Digital Lightpath Label Transcoding for Dual-Polarization QPSK Systems", OFC/NFOEC 2011, JWA28, for example, discusses a method in which, in optical fiber communication where a main signal is transmitted by polarization multiplexing, the polarization state is changed by biasing the frequency of modulation data in the transmitted light, and the change in the polarization state is read using a reception side polarimeter.

However, in the techniques in the related art, in free space optical communication, there is a problem in that it is difficult to stably transmit data by superimposing control information which indicates a demodulation method or a decoding method of the data, without adding an optical component. For example, when the control information is superimposed and transmitted by performing intensity modulation with respect to an optical data signal, it is difficult to receive control information at the reception side, because loss of an optical signal which is intensity modulated is large in a free space. In addition, an optical component such as a polarizer is desirable at the reception side when control information is superimposed and transmitted by changing the polarization state.

SUMMARY

According to an aspect of the invention, an apparatus which transmits data and control information which indicates at least one of a demodulation method and a decoding method of the data using an optical signal, includes: a modulator configured to perform modulation in which a rate of change of a polarization state of light is changed according to the control information, and modulation in which a characteristic of light which is different from the rate of change of the polarization state is changed in accordance with the data; and an emitting section configured to emit light, on which modulation is performed using the modulator, to another communication apparatus via a free space.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments 1 to 4 will be described below in detail with reference to the drawings. Example of communication system according to embodiment 1.

Figure 1:
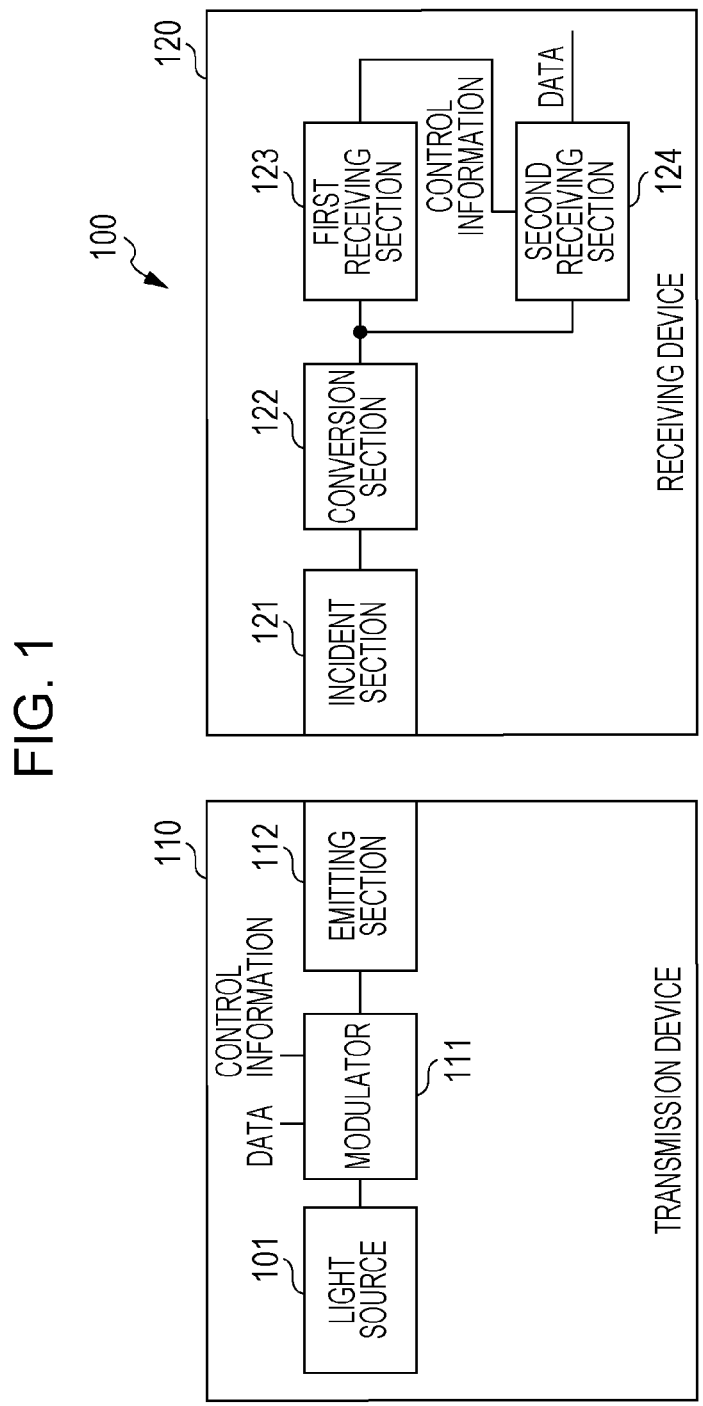
FIG. 1 is a view illustrating an example of a communication system according to embodiment 1.

FIG. 1 is a view illustrating an example of a communication system according to embodiment 1. A communication system 100 has a transmission device 110 and a receiving device 120. In the communication system 100 free space optical (FSO) communication is performed in which an optical signal is transmitted from the transmission device 110 to the receiving device 120 via a free space. Free space optical communication is, for example, optical wireless communication in which an optical signal is transmitted via an optical space without using a transmission line such as optical fiber on an optical signal transmission path.

For example, the communication system 100 is able to be adopted between buildings, between mobile bodies, and the like instead of laying optical fiber at a topographically difficult location, a region where there is no existing optical fiber, and the like. The transmission distance between the transmission device 110 and the receiving device 120 is, for example, 500 m to 1 km. However, the applications or the transmission distance of the communication system 100 are not limited thereto.

The transmission device 110 transmits modulated light to the receiving device 120 according to data and control information. The data is, for example, user data.

The control information is information which illustrates at least one of a demodulation method and a decoding method of data. For example, in a case where a demodulation method is known in the receiving device 120, the control information is able to be set as information which indicates a decoding method without indicating the demodulation information. In addition, for example, in a case where a decoding method is known in the receiving device 120, the control information is able to be set as information which indicates a demodulation method without indicating the decoding information. In a case where neither of the demodulation method or the decoding method are known in the receiving device 120, the control information is able to be set as information which indicates the demodulation method and the decoding method.

In addition, the control information is information which directly or indirectly indicates at least one of the demodulation method and the decoding method to the receiving device 120. The information which indirectly indicates at least one of the demodulation method and the decoding method is, for example, able to be set to transmission source identification information, channel identification information, or the like. In this case, the receiving device 120 is able to determine the demodulation method or the decoding method with reference to a table or the like corresponding to at least one of transmission source identification information or channel identification information, and data of the demodulation method or the decoding method.

In addition, information which indirectly indicates data of at least one of the demodulation method or the decoding method may be information which indicates data of at least one of a modulation method and an encoding method. In this case, the receiving device 120 is able to determine the demodulation method or the decoding method based on the modulation method or the encoding method which is indicated by the control information. In addition, the control information may further include, for example, information or the like which has an effect on free space optical communication such as weather information, or arbitrary information.

Transmission Device Configuration

Next, the configuration of the transmission device 110 will be described. The transmission device 110 has a light source 101, a modulator 111, and an emitting section 112. The light source 101 generates light, and outputs the generated light to the modulator 111. Here, in the example illustrated in FIG. 1, the light source 101 is provided inside the transmission device 110, but may be provided outside the transmission device 110.

The modulator 111 modulates light which is received from the light source 101 based on input data and control information. Then, the modulator 111 outputs the modulated light to the emitting section 112.

The modulation by the modulator 111 is modulation in which the rate of change of the polarization state is changed according to the control information, and is modulation in which a predetermined characteristic is changed according to the data.

The modulation which is changed according to the control information is, for example, a process for placing control information in light, and is modulation in which it is possible to demodulate the control information from the optical signal at the reception side. The modulation which is changed according to the data is, for example, a process for placing the data in light, and is modulation in which it is possible to demodulate the data from the optical signal at the reception side. The modulation in which the rate of change of the polarization state of light is, for example, modulation in which the angular velocity of polarization rotation of light is changed.

The predetermined characteristic is a characteristic of light which is different from the rate of change of the polarization state of the light. For example, the predetermined characteristic is phase, intensity, frequency, polarization state, and the like. It is possible to use various modulation methods in the modulation method with a predetermined characteristic. For example, in a case where the predetermined characteristic is the phase, it is possible to use modulation methods with various phases such as binary phase shift keyring (BPSK), quadrature phase shift keyring (QPSK), and the like in the modulation method with a predetermined characteristic. In addition, in the modulation method with a predetermined characteristic quadrature amplitude modulation (QAM), intensity modulation, frequency modulation, polarization modulation, or the like may be used.

The modulation by the modulator 111 is, for example, able to set modulation in which the rate of change of the polarization state is changed according to the control information, and modulation is performed in which a predetermined characteristic is changed according to the data using one modulator. Alternatively, the modulation by the modulator 111 is, for example, able to set modulation to perform modulation in which the rate of change of the polarization state is changed according to the control information, and modulation in which the predetermined characteristic is changed according to the data using respectively different modulators.

The emitting section 112 transmits light, which is received from the modulator 111, to the receiving device 120 via a free space. The free space is, for example, a space in the atmosphere, but may be a space in a vacuum such as outer space or the like.

In this manner, since the transmission device 110 according to embodiment 1 modulates the rate of change of the polarization state of the light using control information, and modulates a characteristic of the light different from the rate of change of the polarization state of light using data, it is possible to transmit an optical signal in which control information and data are superimposed in free space optical communication. In addition, since variation of the rotation speed of the polarization state is small in the free space, it is possible to transmit control information with low loss.

Receiving Device Configuration

Next, the configuration of the receiving device 120 will be described. The receiving device 120 has an incident section 121, a conversion section 122, a first receiving section 123, and a second receiving section 124. In the incident section 121, light which is transmitted from the emitting section 112 of the transmission device 110 is incident via the free space. The incident section 121 outputs the incident light to the conversion section 122.

The conversion section 122 carries out photoelectric conversion on the light which is incident to the incident section 121. For example, the conversion section 122 converts the light which is incident to the incident section 121 to an electrical signal according to the intensity of the light. Then, the conversion section 122 outputs the electrical signal obtained by the conversion to the first receiving section 123 and the second receiving section 124.

The first receiving section 123 receives the control information which is transmitted by the transmission device 110 using an optical signal by detecting the rate of change of the polarization state of the light which is incident to the incident section 121 based on the electrical signal which is received from the conversion section 122.

Then, the first receiving section 123 outputs the received control information to the second receiving section 124.

The second receiving section 124 receives data based on the electrical signal which is received from the conversion section 122 and the control information which is received from the first receiving section 123.

For example, in a case where the control information is information which indicates the demodulation method, the second receiving section 124 demodulates data by detecting the predetermined characteristic of the light which is incident to the incident section 121 using information which indicates the electrical signal from the conversion section 122 and the demodulation method from the first receiving section 123.

In addition, in a case where the control information is information which indicates the decoding method, the second receiving section 124 demodulates data using the electrical signal which is received from the conversion section 122, and decodes the demodulated data using information which indicates the decoding method which is received from the first receiving section 123.

In addition, in a case where the control information is information which indicates the demodulation method and the decoding method, the second receiving section 124 demodulates data by detecting the characteristic of the light which is different from the rate of change of the polarization state of the light which is incident to the incident section 121 using information which indicates the electrical signal and the demodulation method.

Then, the second receiving section 124 decodes the demodulated data using information which indicates the decoding method.

In this manner, since the receiving device 120 receives the control information by detecting the rate of change of the polarization state of the light, and receives data using the control information, it is possible to transmit the optical signal in which the control information and the data are superimposed in free space optical communication.

In addition, since variation of the rotation speed of the polarization state is small in the free space, it is possible to transmit control information with low loss.

Embodiment 2

Figure 2:
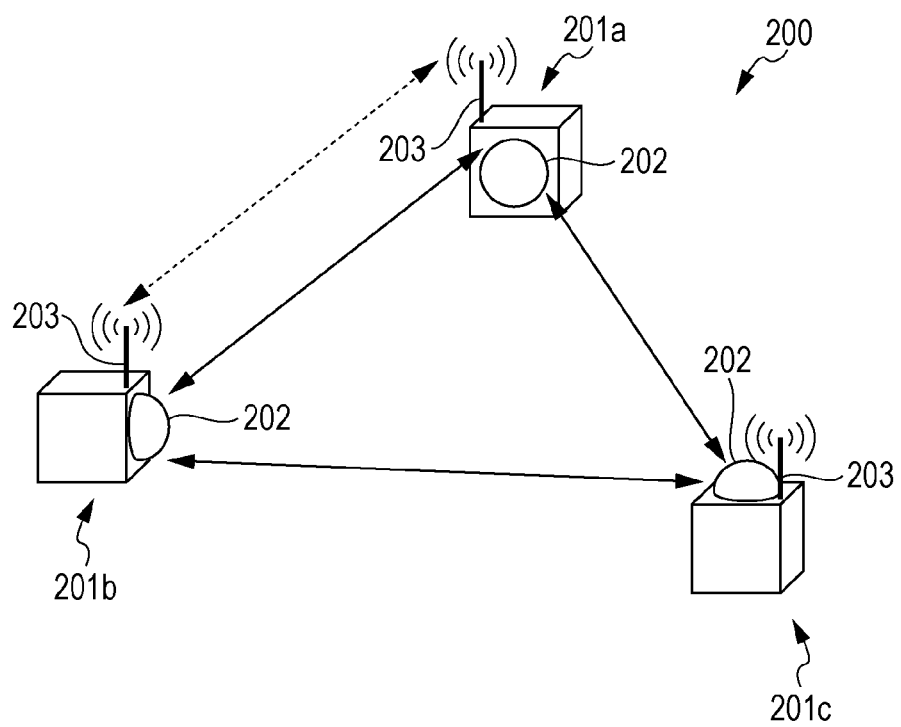
FIG. 2 is a view illustrating an example of a communication system according to embodiment 2.

Next embodiment 2 will be described. Example of communication system according to embodiment 2. FIG. 2 is a view illustrating an example of a communication system according to embodiment 2. As illustrated in FIG. 2, a communication system 200 has a plurality of communication devices 201 (201a, 201b, 201c). The plurality of communication devices 201 perform free space optical communication with each other. The plurality of communication devices 201 each have a lens section 202 and an antenna 203. The lens section 202 receives an optical signal from another communication device 201. For example, the lens section 202 is able to use a wide-angle lens such as a fish-eye lens, and is able to receive light from a different direction. Then, the lens section 202 outputs the optical signal which is received from the other communication device 201 to an optical/electrical (O/E) converter within the own device which is not illustrated in the drawings.

The O/E converter converts the optical signal which is received from the lens section 202 to an electrical signal. In addition, the O/E converter converts the signal which is transmitted to the other communication device 201 from the electrical signal to an optical signal, and outputs the optical signal obtained by conversion to the lens section 202. The lens section 202 transmits the optical signal obtained by conversion of the O/E converter to the other communication device 201.

In addition, the antenna 203 transmits and receives radio waves to and from the other communication device 201. It is possible to use a low-speed command link instead of a main data link in free space optical communication between the plurality of communication devices 201 using the antenna 203. For this reason, it is also possible to perform approximate alignment between the communication devices 201, optimize the modulation method and encoding method by aligning with the communication state of the space communication path which varies over time due to the weather and the like, and perform free space optical communication in which communication quality is stabilized. In the example illustrated in FIG. 2, the communication system 200 has three communication devices 201, but it is sufficient to have at least two communication devices 201.

Configuration example of communication system according to embodiment 2

Figure 3:
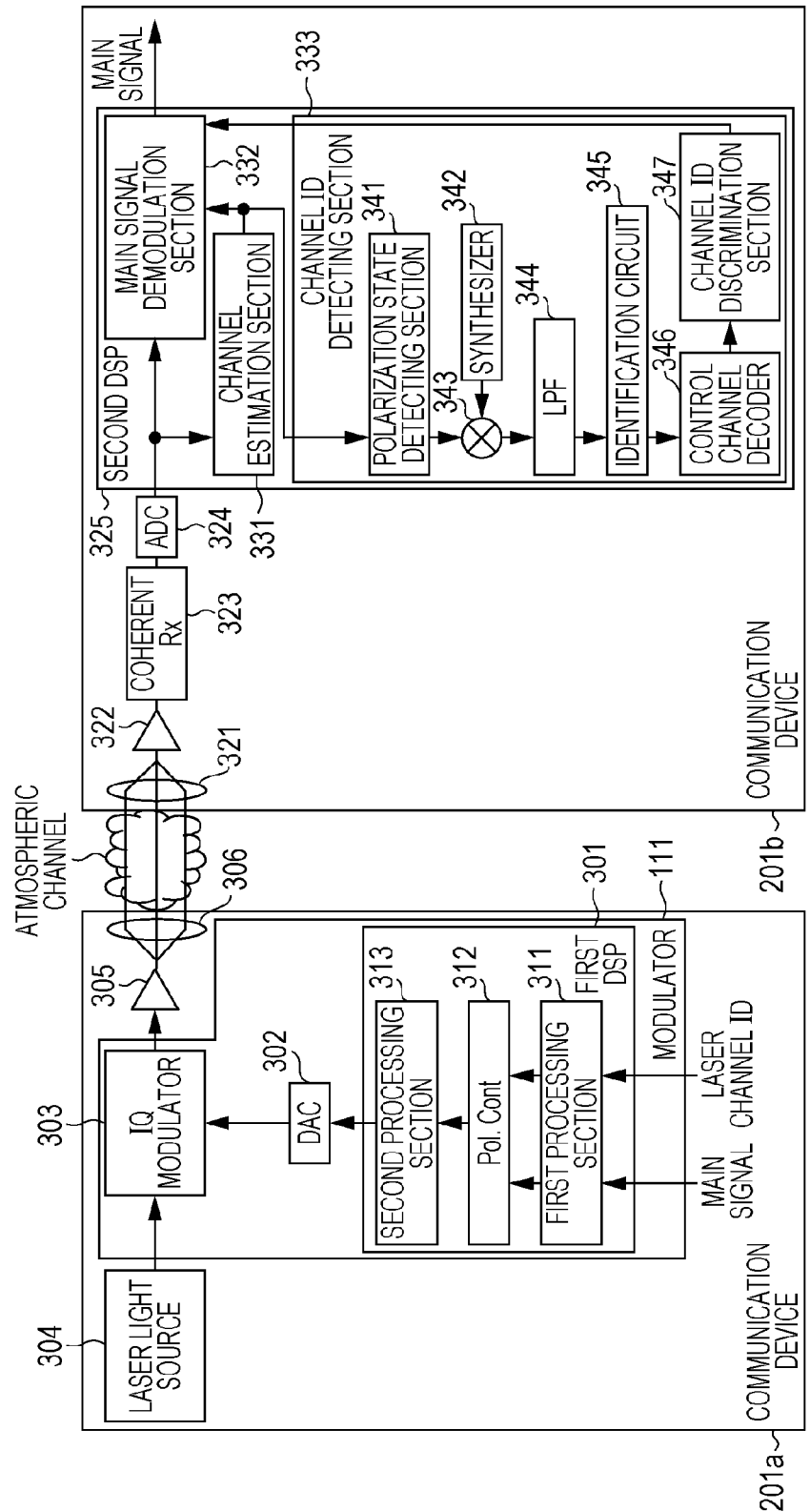
FIG. 3 is a view illustrating a configuration example of the communication system according to embodiment 2.

FIG. 3 is a view illustrating a configuration example of the communication system according to embodiment 2. In FIG. 3, a configuration at the transmission side of the communication device 201a and the configuration at the reception side of the communication device 201b are described using the communication device 201a and the communication device 201b which are illustrated in FIG. 2.

First, the transmission side communication device 201a will be described. As illustrated in FIG. 3, the transmission side communication device 201a has a first digital signal processor (DSP) 301 and a digital to analog converter (DAC) 302. In addition, the communication device 201a has an inphase/quadrature (IQ) modulator 303, a laser light source 304, an amplifier 305, and a lens 306.

The first DSP 301 generates an electrical signal for modulation based on a laser channel ID as the control information and a main signal as the data. The electrical signal for modulation is an electrical signal for changing the rate of change of the polarization state of the light in the IQ modulator 303 according to the control information, and performing modulation in which the characteristic of the light which is different from the rate of change of the polarization state of the light is changed according to the main signal. Below, "rate of change of the polarization state of the light" has the meaning "angular velocity of the rotation speed of the light". In addition, below, "characteristic of the light which is different from the rate of change of the polarization state of the light" has the meaning "characteristic of the light which is different from the angular velocity".

The first DSP 301 has a first processing section 311, a polarization controller (described as "Pol. Cont." in the drawings) 312, and a second processing section 313. The main signal and the control information such as the laser channel ID which is represented by control channel bit rows are input to the first processing section 311. In addition, the first processing section 311 generates a modulation signal for modulation using a predetermined modulation method according to the input main signal. Then, the first processing section 311 outputs the generated modulation signal to the polarization controller 312.

In addition, the first processing section 311 converts a control channel modulation row of 0 or 1 which indicates the laser channel ID to a control channel modulation row which uses 0 or ω1 which indicates the angular velocity of the polarization rotation. Then, the first processing section 311 outputs the control channel modulation row which is obtained by conversion to a polarization controller 312.

Here, any of a phase modulation method, an intensity modulation method, a frequency modulation method, a polarization modulation method, or the like can be adopted as the modulation method of the main signal. In a case where the modulation method of the main signal is intensity modulation, a change of the angular velocity of the polarization rotation of the light and a change of intensity of the optical signal do not affect each other. For this reason, the reception side communication device 201b is able to receive each of the main signal and the control signal. The modulation method of the main signal is similar in the case of frequency modulation.

Meanwhile, in a case where the modulation method of the main signal is phase modulation, polarization modulation, or the like, a change of the angular velocity of the polarization rotation of the light and a change of polarization of the optical signal affect each other. For this reason, the modulation frequency in which the angular velocity of the polarization rotation of the light is changed is sufficiently lower than the modulation frequency of the phase modulation or the polarization modulation. For example, the modulation frequency in which the angular velocity of the polarization rotation of the light is changed is 100 kHz or less. In addition, the modulation frequency of the main signal is, for example, 1 MHz. In this manner, the modulation frequency in which the angular velocity of the polarization rotation of the light is changed is sufficiently low in comparison to the modulation frequency of the main signal.

For this reason, the reception side communication device 201b is able to receive each of the main signal and the control information. In embodiment 2, for example, BPSK, QPSK, 16QAM, 32QAM, or the like are used as the modulation method of the main signal. However, the modulation method of the main signal below is appropriately referred to as the phase modulation method.

The signal for modulating using the predetermined modulation method according to the main signal and the signal which indicates the control channel modulation row are input to the polarization controller 312 from the first processing section 311. The polarization controller 312 generates a signal in order to perform modulation in which an angular velocity ω of the polarization rotation of the light is changed according to the control channel modulation row and the modulation for modulating using the predetermined modulation method according to the main signal based on each signal which is received from the first processing section 311. Then, the polarization controller 312 outputs the generated signal to the second processing section 313.

For example, the polarization controller 312 generates a signal for performing modulation in which the angular velocity of a predetermined level is changed. The polarization controller 312 is, for example, able to generate a signal for performing modulation of a rotation speed of two levels of "1" and "0" using the angular velocity ω1 (ω1>0) and an angular velocity ω2 (ω2=0).

In addition, the polarization controller 312 is, for example, able to generate a signal for performing modulation of a rotation speed of five levels using the angular velocity+ω1 (ω1>0), the angular velocity ω2 (=0), an angular velocity+ω3 (ω3>ω1), an angular velocity −ω1, and an angular velocity −ω3.

The second processing section 313 multiplies, for example, the inverse characteristic of the DAC 302 which has incompleteness of an analog signal with respect to the signal which is output from the polarization controller 312. Then, the second processing section 313 outputs the signal which is multiplied by the inverse characteristic to the DAC 302. The DAC 302 converts a digital signal which is received from the second processing section 313 to an analog signal. Then, the DAC 302 outputs the analog signal which is obtained by conversion to the IQ modulator 303.

The laser light source 304 generates laser light, and outputs the generated laser light to the IQ modulator 303. For example, a laser diode is used as the laser light source 304. For example, it is possible to adopt a vertical resonator surface emitting laser (Bichsel) or the like as the laser diode. The IQ modulator 303 generates an optical signal by modulating the light which is output from the laser light source 304 using the analog signal which is received from the DAC 302. Then, the IQ modulator 303 outputs the generated optical signal to the amplifier 305. For example, the IQ modulator 303 changes the angular velocity of the polarization rotation of the light and the phase of the light by utilizing a change in refractive index according to the electrical signal which is generated by the first DSP 301. For example, a lithium niobate (LN) modulator is used as the IQ modulator 303.

The amplifier 305 amplifies the optical signal which is received from the IQ modulator 303, and outputs the amplified optical signal to the lens 306. In addition, the lens 306 emits the optical signal which is received from the amplifier 305 to the free space. For example, a collimator lens is used as the lens 306. The collimator lens emits the optical signal which is received from the amplifier 305 to the free space in a state of being a collimator.

Next, the reception side communication device 201b will be described.

The reception side communication device 201b has a lens 321, an amplifier 322, a coherent receiver ("Coherent Rx" in the drawings) 323, an analog to digital converter (ADC) 324, and a second DSP 325. The lens 321 condenses the optical signal which is emitted from the transmission side communication device 201a, and outputs the condensed optical signal to the amplifier 322. The amplifier 322 amplifies the optical signal which is received from the lens 321, and the amplified optical signal is output to the coherent receiver 323. The coherent receiver 323 photoelectrically converts the optical signal which is received from the lens 321 to an electrical signal according to the intensity of the received optical signal. Then, the coherent receiver 323 outputs the electrical signal which is obtained by photoelectric conversion to the ADC 324.

For example, the coherent receiver 323 has a photodetector which photoelectrically converts the optical signal to the electrical signal according to the intensity of the optical signal. The ADC 324 converts the analog signal which is received from the coherent receiver 323 to a digital signal. Then, the ADC 324 outputs the digital signal which is obtained by the conversion to the second DSP 325. The second DSP 325 has a channel estimation section 331, a main signal demodulation section 332, and a channel ID detecting section 333. The channel estimation section 331 receives the digital signal from the ADC 324. The channel estimation section 331 performs channel estimation by, for example, a constant modulus algorithm (CMA) method or the like using the digital signal which is received from the ADC 324. Then the channel estimation section 331 outputs a channel estimation result to the main signal demodulation section 332 and the channel ID detecting section 333.

For example, the channel estimation by the channel estimation section 331 is estimation of an inverse characteristic to the characteristic of the entirety of the transmission path. For example, the channel estimation section 331 estimates the inverse characteristic to the low-pass characteristic of the analog signal in a photodiode of the coherent receiver 323 or the ADC 324.

The main signal demodulation section 332 receives a digital signal from the ADC 324. In addition, the main signal demodulation section 332 receives the channel estimation result from the channel estimation section 331. In addition, the main signal demodulation section 332 receives information which is desired in demodulation of the main signal which is specified from the modulation method of the main signal, the baud rate, or the like from a channel ID discrimination section 347. The main signal demodulation section 332 performs demodulation or decoding of the main signal using the signal which is received from the ADC 324, the channel estimation result which is received from the channel estimation section 331, and information which is desired to demodulate or decode the main signal which is received form a control channel decoder 346.

For example, the main signal demodulation section 332 multiplies the inverse characteristic of the entirety of the transmission path that the channel estimation result, which is received from the channel estimation section 331, indicates in the digital signal which is received from the ADC 324. For example, the main signal demodulation section 332 has a finite impulse response (FIR) filter, and is able to multiply the inverse characteristic by setting a coefficient of the FIR filter based on the inverse characteristic. In addition, for example, the main signal demodulation section 332 is able to perform demodulation or decoding of the main signal by feeding back the digital signal which is received from the ADC 324, and receiving the information which is desirable in demodulation and decoding of the main signal from the channel ID discrimination section 347.

The channel ID detecting section 333 has a polarization state detecting section 341, a synthesizer 342, a multiplying section 343, a low pass filter (LPF) 344, an identification circuit (also a called decision circuit) 345, the control channel decoder 346, and the channel ID discrimination section 347. The polarization state detecting section 341 receives the channel estimation result from the channel estimation section 331. The polarization state detecting section 341 outputs information (matrix element) which indicates a pattern of the polarization state from the channel estimation result which is received from the channel estimation section 331.

Furthermore, the polarization state detecting section 341 detects, for example, information (sin wave) which indicates that a good polarization state where the amplitude has a large signal/noise (S/N) ratio from the detected information. Then, the polarization state detecting section 341 outputs the information which indicates the detected sin wave to the multiplying section 343.

The synthesizer 342 generates information which indicates sin $\omega$, and outputs the generated information to the multiplying section 343. For example, the synthesizer 342 is for example, a clock synthesizer which generates a clock of speed $\omega$ which that corresponds to the angular velocity $\omega$ of the polarization rotation of the light in the communication device 201a.

The multiplying section 343 multiplies the sin wave which indicates the information which is received from the polarization state detecting section 341 and the sin wave which indicates information which is received from the synthesizer 342. Then, the multiplying section 343 outputs a value obtained by the multiplying to the LPF 344. The LPF 344 cuts a predetermined component such as noise out of a value which is received from the multiplying section 343. Then, the LPF 344 outputs the value where the predetermined component is cut to the identification circuit 345.

In this manner, the reception side communication device 201b is able to detect the laser channel ID by synchronous detection using the polarization state detecting section 341, the synthesizer 342, the multiplying section 343, and the LPF 344. The identification circuit 345 identifies the value which is received from the LPF 344 as, for example $\omega 1$ if equal to or more than the identification value, and 0 if less than the identification value. Then, the identification circuit 345 outputs the control channel modulation row ($\omega 1$, 0, $\omega 1$, . . . ) which is obtained from the identification result to the control channel decoder 346.

The control channel decoder 346 converts the control channel modulation row which is received from the identification circuit 345 to a control channel bit row (laser channel ID) which is represented by "1" and "0". For example, the control channel decoder 346 converts the control channel modulation row which is indicated by the signal which is received from the identification circuit 345 to "1" if $\omega 1$ and to "0" if 0. Then, the control channel decoder 346 outputs the control channel bit row which is obtained by the conversion to the channel ID discrimination section 347. The channel ID discrimination section 347 extracts information which corresponds to the control channel bit row which is received from the control channel decoder 346, and the extracted information is output to the main signal demodulation section 332.

The information which corresponds to the control channel bit row is described below in detail using FIG. 8, but is information on the modulation method of the transmission side communication device 201a, the modulation method such as the baud rate, the encoding method such as a forward error correction (FEC) method, or the like.

The first DSP 301 and the second DSP 325 described above are not limited to DSP, and, for example, can be realized by various digital circuits such as a field programmable gate array (FPGA).

In addition, the first processing section 311, the polarization controller 312, and the second processing section 313 are provided in the first DSP 301, but may each be provided in different DSP.

In addition, the transmission device 110 which is illustrated in FIG. 1 can be realized by the communication device 201a.

In addition, the modulator 111 can, for example, be realized by the first DSP 301, the DAC 302, and the IQ modulator 303.

The emitting section 112 can, for example, be realized by the lens 306.

In addition, an electrical circuit which generates the electrical signal for modulation based on the data and the control information can, for example, be realized by the first DSP 301.

In addition, the modulator in which the rotation speed of the polarization rotation of the light and the characteristic of the light which is different from the rotation speed are changed according to the electrical signal which is generated by the first DSP 301 can, for example, be realized by the IQ modulator 303.

In addition, the receiving device 120 which is illustrated in FIG. 1 can be realized by the communication device 201b.

In addition, the incident section 121 can, for example, be realized by the lens 321.

In addition, the conversion section 122 can, for example, be realized by the amplifier 322 and the coherent receiver 323.

The first receiving section 123 can, for example, be realized by the channel estimation section 331 and the second DSP 325. The second receiving section 124 can, for example, be realized by the channel estimation section 331 and the main signal demodulation section 332.

Next, the configuration of each component which is illustrated in FIG. 3 will be described using FIGS. 4 to 7.

Example of First Processing Section

Figure 4:
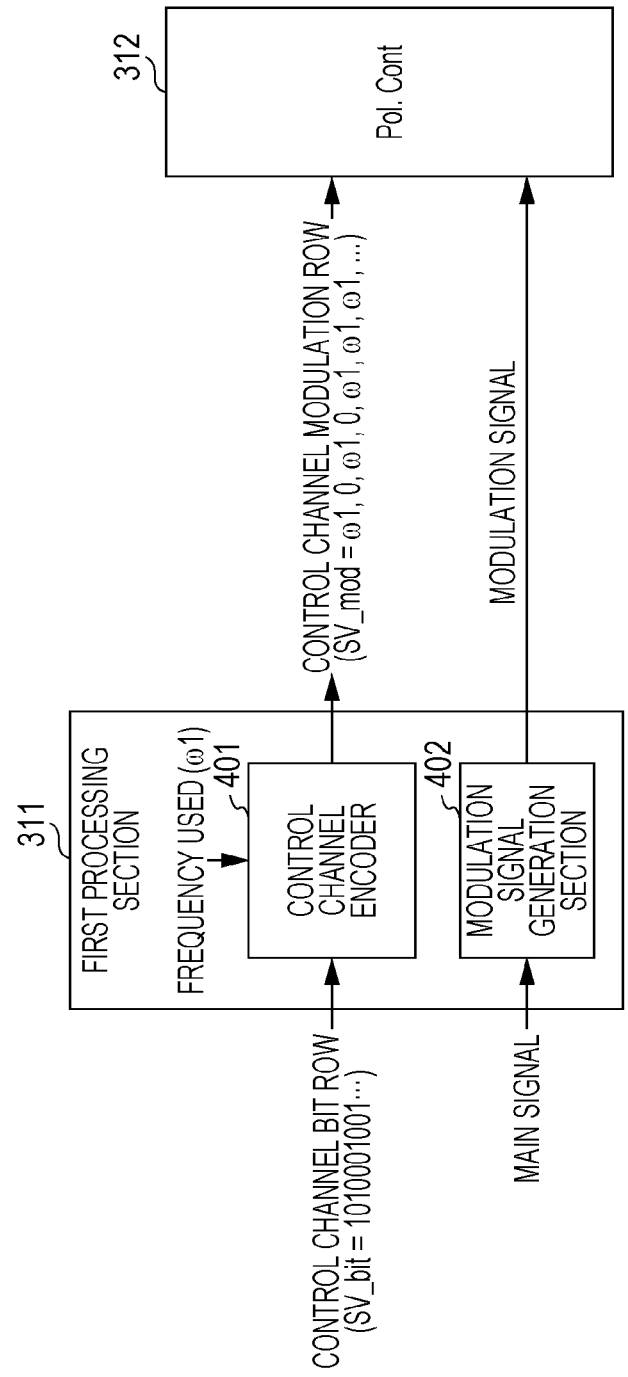
FIG. 4 is a view illustrating an example of a first processing section.

FIG. 4 is a view illustrating an example of the first processing section. As illustrated in FIG. 4, the first processing section 311 has a control channel encoder 401 and a modulation signal generation section 402.

The control channel bit row which indicates the laser channel ID is input to the control channel encoder 401. In addition, the frequency (for example, the angular velocity ω1) which is used is input to the control channel encoder 401. The control channel encoder 401 converts the control channel bit row to a control channel modulation row which uses 0 or ω1 according to the received control channel bit row. The control channel encoder 401 outputs the control channel modulation row which is obtained by the conversion to the polarization controller 312.

In addition, the main signal is input to the modulation signal generation section 402. For example, the modulation signal generation section 402 generates a modulation signal for phase modulation using the received main signal. Then, the modulation signal generation section 402 outputs the generated modulation signal to the polarization controller 312. Thereby, the control channel modulation row from the control channel encoder 401 and the modulation signal for performing phase modulation are input to the polarization controller 312.

Example of Polarization Controller

Figure 5:
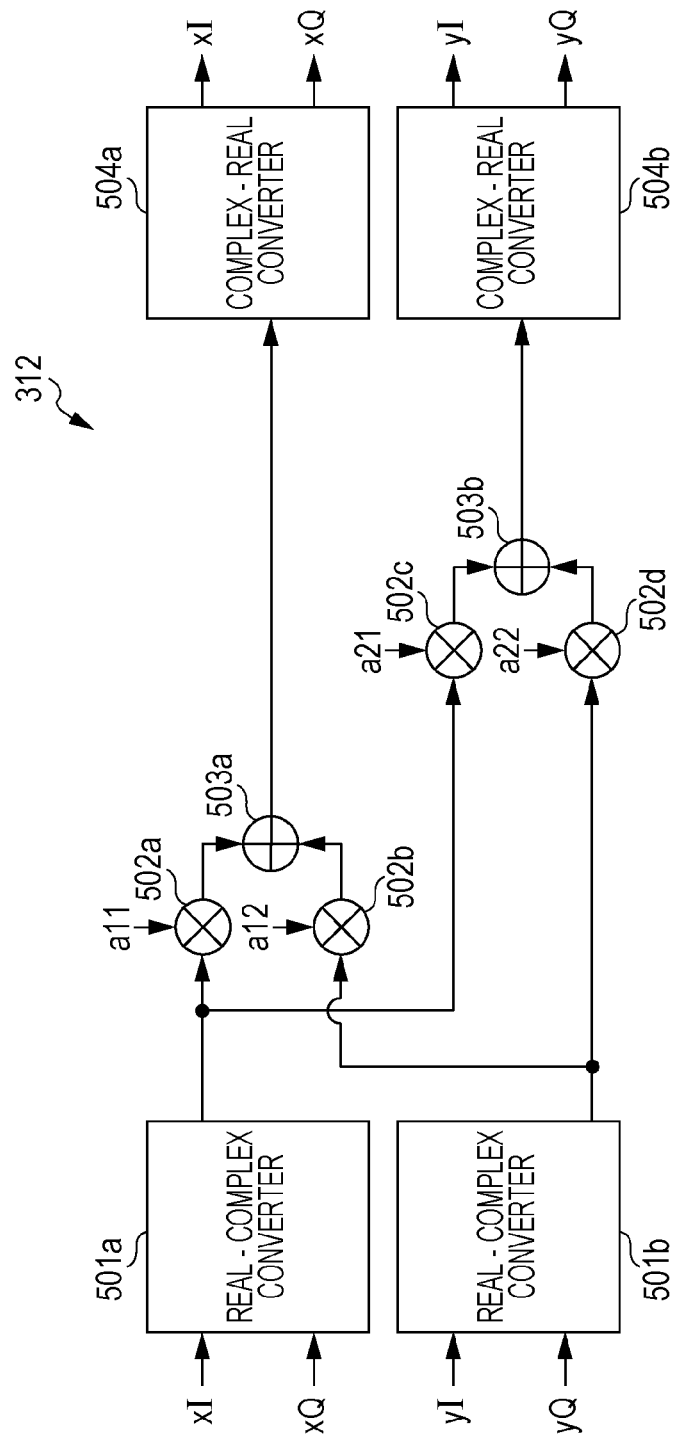
FIG. 5 is a view illustrating an example of a polarization controller.

FIG. 5 is a view illustrating an example of the polarization controller. The polarization controller 312 has a plurality of real-complex converters 501 (501a, 501b), and a plurality of multiplying sections 502 (502a, 502b, 502c, 502d). In addition, the polarization controller 312 has a plurality of adding sections 503 (503a, 503b), and a plurality complex-real converters 504 (504a, 504b).

The real-complex converter 501a receives signals xI and xQ which indicate a modulation signal which is generated according to the modulation method in the modulation signal generation section 402 (refer to FIG. 4) of the first processing section 311. The real-complex converter 501a converts the received modulation signal to a complex number. For example, the real-complex converter 501a converts the received modulation signal to, for example, a complex number which sets xQ as an imaginary part out of xI and xQ. The real-complex converter 501a outputs the signal which is converted to a complex number to the multiplying section 502a and the multiplying section 502c.

In addition, the real-complex converter 501b receives signals yI and yQ which indicate a modulation signal which is generated according to the modulation method in the modulation signal generation section 402 (refer to FIG. 4) of the first processing section 311.

The real-complex converter 501b converts the received modulation signal to a complex number. For example, the real-complex converter 501b converts the received signal to, for example, a complex number which sets yQ as an imaginary part out of yI and yQ. The real-complex converter 501b outputs the signal which is converted to a complex number to the multiplying section 502b and the multiplying section 502d. The multiplying sections 502a, 502b, 502c, and 502d each multiply a value a (a11, a12, a21, a22) which is indicated in equation (1) described below which is an equation of polarization control using the control channel modulation row which is received from the control channel encoder 401 (refer to FIG. 4).

In the angular velocity ω of equation (1) described below, ω1 or 0 are assigned which are indicated by the control channel modulation row which is received from the control channel encoder 401.

$$R(\omega) = \begin{pmatrix} a11 & a12 \\ a21 & a22 \end{pmatrix} = \begin{pmatrix} \cos\omega t & -\sin\omega t \\ \sin\omega t & \cos\omega t \end{pmatrix} \quad (1)$$

For example, the multiplying section 502a multiplies a11 (cos ω) by the complex number which is indicated by the signal which is received from the real-complex converter 501a. Then, the multiplying section 502a outputs the value of the multiplication result to the adding section 503a. In addition, the multiplying section 502b multiplies a12 (–sin ω) by the complex number which is indicated by the signal which is received from the real-complex converter 501b. Then, the multiplying section 502b outputs the value of the multiplication result to the adding section 503a.

In addition, the multiplying section 502c multiplies a21 (sin ω) by the complex number which is indicated by the signal which is received from the real-complex converter 501a. Then, the multiplying section 502c outputs the value of the multiplication result to the adding section 503b.

In addition, the multiplying section 502d multiplies a22 (cos ω) by the complex number which is indicated by the signal which is received from the real-complex converter 501b. Then, the multiplying section 502d outputs the value of the multiplication result to the adding section 503b.

The adding section 503a adds the value which is received from the multiplying section 502a and the value which is received from the multiplying section 502b. Then, the adding section 503a outputs the added value to the complex-real converter 504a.

The adding section 503b adds the value which is received from the multiplying section 502c and the value which is received from the multiplying section 502d. Then, the adding section 503b outputs the added value to the complex-real converter 504b.

The complex-real converter 504a converts the value which is received from the adding section 503a to a real number and outputs. For example, the complex-real converter 504a converts the imaginary part (xQ) out of the value which is received from the adding section 503a to a real number, and outputs the signal xI and xQ. The complex-real converter 504b converts the value which is received from the adding section 503b to a real number and outputs. For example, the complex-real converter 504b converts the imaginary part (yQ) out of the value which is received from the adding section 503a to a real number, and outputs the signal yI and yQ.

It is possible to generate a modulation signal for performing modulation in which the angular velocity ω of the polarization rotation of the light is changed by the polarization controller 312.

Example of Polarization State Detecting Section

Figure 6:
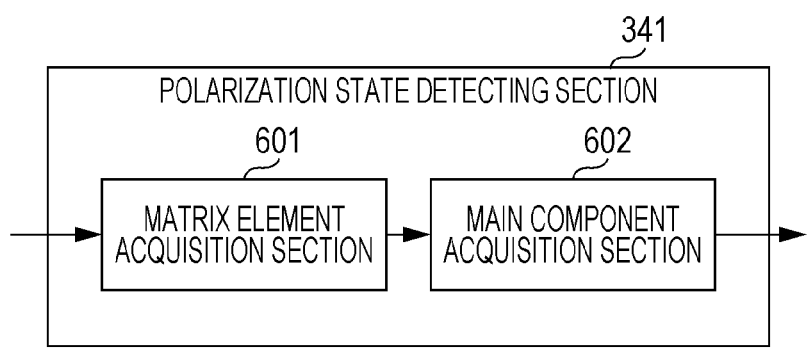
FIG. 6 is a view illustrating an example of a polarization state detecting section.

FIG. 6 is a view illustrating an example of the polarization state detecting section. The polarization state detecting section 341 has a matrix element acquisition section 601 and a main component acquisition section 602. The matrix element acquisition section 601 receives the channel estimation result from the channel estimation section 331, and extracts the matrix element (refer to the matrix element 700 in FIG. 7) which indicates the pattern of the polarization state from inside the received channel estimation result. Then, the matrix element acquisition section 601 outputs the extracted matrix element to the main component acquisition section 602. The main component acquisition section 602 extracts, for example, the main component (sin wave) with good quality where the amplitude has a large S/N ratio from within the matrix element which is received from the matrix element acquisition section 601.

Figure 7:
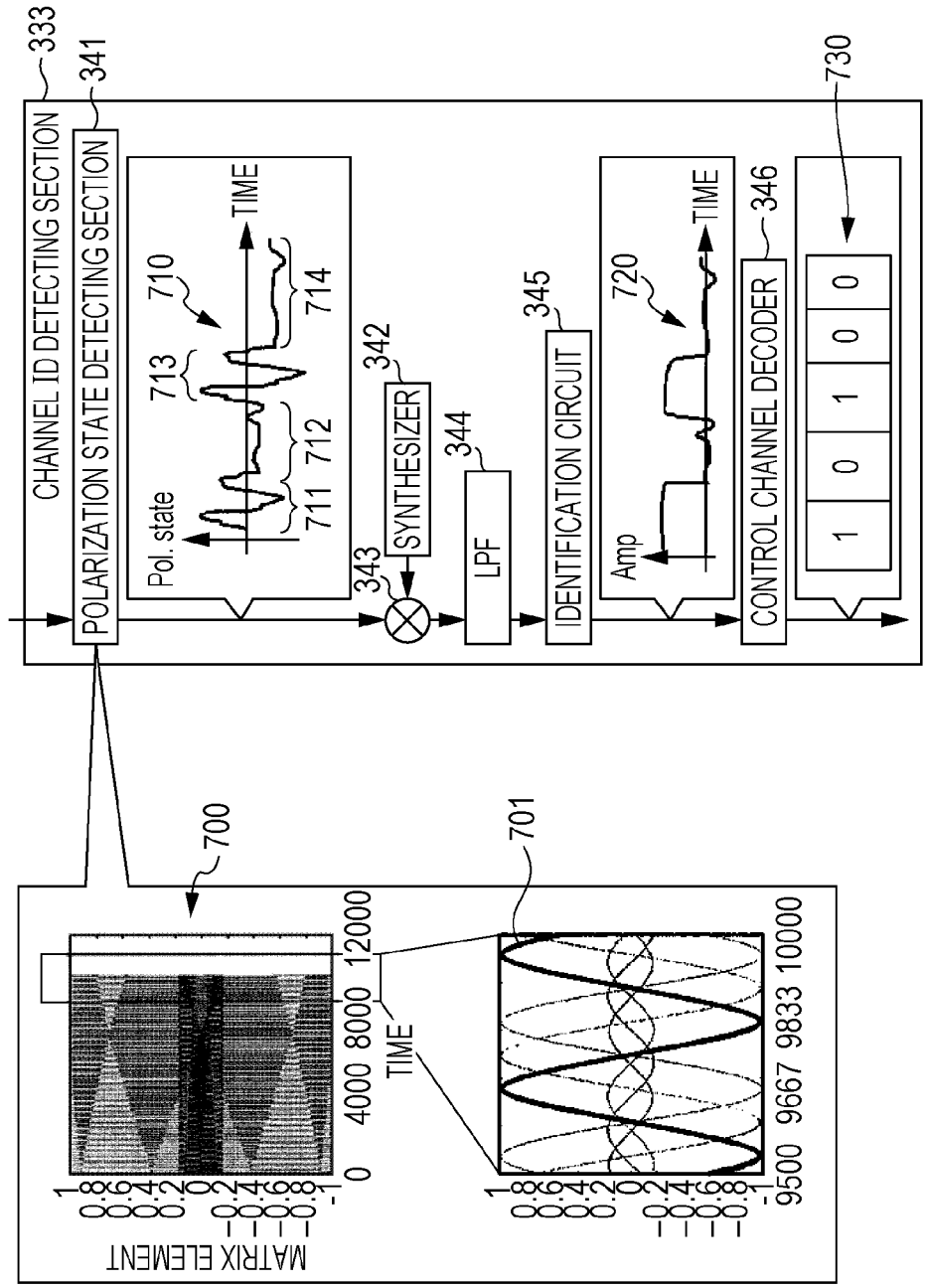
FIG. 7 is a view illustrating an example of a signal which is detected by a channel ID detecting section.

The main component acquisition section 602 outputs the extracted sin wave to the multiplying section 343 (refer to FIG. 3) as time series data (refer to the time series data 710 in FIG. 7). Thereby, the polarization state detecting section 341 is able to detect information (sin wave) which indicates the polarization state. Here, the multiplying section 343 multiplies the sin wave which indicates the time series data which is received from the polarization state detecting section 341 and the sin wave which is received from the synthesizer 342.

Example of Signal Detected by Channel ID Detecting Section

FIG. 7 is a view illustrating an example of a signal which is detected by the channel ID detecting section. As illustrated in FIG. 7, the polarization state detecting section 341 of the channel ID detecting section 333 detects the matrix element 700 which indicates the pattern of the polarization state from within the information which is received from the channel estimation section 331. For example, the matrix element 700 is a channel response matrix, and mathematically represents the state of transmission. The polarization state detecting section 341 detects, for example, the main component (sin wave 701) with good quality where the amplitude has a large S/N ratio from within the matrix element 700. The sin wave 701 which is detected by the polarization state detecting section 341 is represented by equation (2) below.

In equation (2) below, A is a modulation signal of a laser channel ID, and is represented, for example, by 1 or 0.

$$\text{Pol\_State}(t) = A(t)\sin(\omega t) + noise(t) \quad (2)$$

In addition, the polarization state detecting section 341 obtains a relationship between the polarization state and time which are indicated in the time series data 710. In the time series data 710, regions 711 and 713 which vary greatly in waveform indicate, for example, the angular velocity of the polarization rotation of the light is changed by the polarization controller 312. In addition, in the time series data 710, regions 712 and 714 which do not vary greatly in waveform indicate, for example, the angular velocity of the polarization rotation of the light is not changed by the polarization controller 312. In addition, the sin wave which the synthesizer 342 outputs to the multiplying section 343 is represented by equation (3) below. In equation (3) below, B represents amplitude of the electrical signal from the synthesizer 342.

When B is made large, the amplitude of the output signal thereof become large.

$$\text{Synthe}(t) = B\sin(\omega t) \quad (3)$$

In addition, the signal after multiplying by the multiplying section 343 is represented by equation (4) below. The signal which is represented by equation (4) below is output from the multiplying section 343 to the LPF 344.

$$\text{out} = \text{Pol\_State}(t) \times \text{Synthe}(t) = (A\sin(\omega t) + noise(t)) \times B\sin(\omega t) = \quad (4)$$
$$\frac{1}{2}BA(t) - \frac{1}{2}BA(t)\cos(2\omega t) + B\sin(\omega t) - noise(t)$$

For example, the LPF 344 removes a part which includes 2ω of a second part which is indicated in equation (4) above and a part which includes noise of a fourth part. Thereby, the value which is indicated by information which is output by the LPF 344 is able to be represented by equation (5) below.

$$\text{LPF(out)} \approx \frac{1}{2}BA(t) \quad (5)$$

The signal which is output from the LPF 344 is output to the identification circuit 345. The identification circuit 345 obtains a waveform which illustrates the relationship between time and output as illustrated in graph 720 using an input signal from the LPF 344. In the graph 720, a location which is raised is, for example, a location equal to or more than an identification value, and the angular velocity ω1 is indicated. In addition, a location which is not raised is, for example, a location less than an identification value, and the angular velocity 0 is indicated. Then, the identification circuit 345 outputs the control channel modulation row (ω1, 0, ω1, . . . ) which is obtained by the identification to the control channel decoder 346.

The control channel decoder 346 converts the control channel modulation row which is indicated by the signal that is received from the identification circuit 345 to "1" if ω1 and to "0" if 0. By doing this, the control channel decoder 346 converts the control channel modulation row to the control channel bit row 730. Then, the control channel decoder 346 outputs the control channel bit row 730 which is obtained by the conversion to the channel ID discrimination section 347 (refer to FIG. 3). The channel ID discrimination section 347 determines information of the modulation method and the encoding method using the control channel bit row 730 which is received from the control channel decoder 346.

Figure 8:
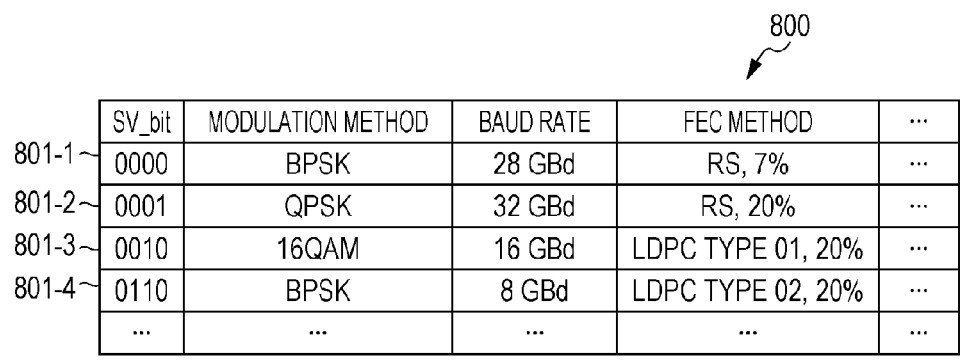
FIG. 8 is a view illustrating an example of a channel ID discrimination table which is used by a channel ID discrimination section.

Example of Channel ID Discrimination Table Used by Channel ID Discrimination Section FIG. 8 is a view illustrating an example of the channel ID discrimination table which is used by a channel ID discrimination section. A channel ID discrimination table 800 which is illustrated in FIG. 8 is used in determination of the control channel bit row using the channel ID discrimination section 347. The control channel bit row, the modulation method, the baud rate, the FEC method, and the like have respective fields in the channel ID discrimination table 800. Determination information 801-1 to 801-4 of each combination of the control channel bit row, the modulation method, the baud rate, the FEC method, and the like is stored as records in the channel ID discrimination table 800 by setting the information in the fields.

The channel ID discrimination section 347 determines the modulation method, the communication speed, error correction, and the like corresponding to the control channel bit row using the channel ID discrimination table 800. When, for example, the channel ID discrimination section 347 sets the control channel bit row "0001", corresponding thereto, it is possible to determine the modulation method QPSK, the baud rate 32 GBd, and the like. By doing this, it is possible to determine the demodulation method and the decoding method of the main signal which is transmitted from the transmission side communication device 201a in the reception side communication device 201b.

In addition, it is also possible for the reception side communication device 201b to identify the transmission side communication device 201a from the determined control channel bit row by storing the identification information for identifying the transmission side communication device 201a by corresponding to the control channel bit row. Thereby, for example, the main signal demodulation section 332 is able to obtain information which is desired in demodulation of the main signal by searching a given table.

The information which is desired in demodulation of the main signal obtained by the search is used in demodulation of the main signal in the main signal demodulation section 332. The information which is stored in the channel ID discrimination table 800 is able to include any information such as, for example, information or the like which has an effect on free space optical communication such as weather information in addition to information which indicates the demodulation method or the decoding method.

As described above, according to embodiment 2, in free space optical communication, modulation in which the phase or the like of the light is changed according to the main signal, and modulation in which the angular velocity of the polarization rotation of the light is changed according to the control information for demodulation or the like of the data are performed.

For this reason, in free space optical communication, it is possible to transmit the optical signal in which the control information and the main signal are superimposed. In addition, since variation of the rotation speed of the polarization state is small in the free space, it is possible to transmit control information with low loss. In addition, according to embodiment 2, even if the control information is not transmitted by a route which is different from the transmission path of the main signal, it is possible to transmit the optical signal in which the control information and the main signal are superimposed. In addition, at the reception side, even if the control information is not received by a route which is different from the transmission path of the main signal, it is possible to receive the optical signal in which the control information and the main signal are superimposed. In addition, since it is possible to determine the modulation method or the like of the optical signal at the reception side at the start of communication, it is possible to receive the optical signal even if it is not possible to determine the modulation method or the like of the optical signal at the start of communication. In addition, in embodiment 2, the IQ modulator 303 performs modulation in which the angular velocity of the polarization rotation of the light and the phase of the light are changed according to the electrical signal which is generated by the first DSP 301.

For this reason, even if an optical component is added in order to perform modulation using the control information with respect to a configuration in which modulation is performed using the main signal, it is possible to transmit the optical signal in which the control information and the main signal are superimposed in free space optical communication. Thereby, it is possible to achieve simplification of the apparatus. In addition, in embodiment 2, even if an overhead bit is not added to the optical signal in order to transmit the control information, it is possible to transmit the optical signal which contains the control information. In addition, in embodiment 2, since the phase modulation method of the main signal is used, when the rotation speed of the polarization state is changed, polarization of the optical signal is changed.

For this reason, the modulation frequency in which the angular velocity of the polarization rotation of light is changed is sufficiently lower than the modulation frequency of phase modulation. Thereby, even if the modulation method of the main signal is a modulation method accompanying a change of polarization, it is possible to transmit the optical signal in which the control information and the main signal are superimposed. In addition, in embodiment 2, detection of the angular velocity ω in the reception side communication device 201b uses a method using synchronous detection. For example, the modulation in which the angular velocity of the polarization rotation of the light is changed according to the control information is set as modulation in which the angular velocity of the polarization rotation of the light is changed to the angular velocity 0, ω1 according to the control information, and the reception side communication device 201b receives the control information using a clock for speed which corresponds to the angular velocity 0, ω1. It is possible to improve reception speed using synchronous detection in this manner. In addition, in embodiment 2, modulation is performed in which the angular velocity of the polarization rotation of the light is changed without information being placed in the polarization of light itself.

Here, in optical fiber communication for example, since the speed of the polarization rotation which is generated in the transmission path of optical fiber or the like is the same degree as speed which is trackable at the reception side, it is difficult to receive the optical signal where modulation is performed in which the angular velocity of the polarization rotation is changed. Meanwhile, as illustrated in embodiment 2, in free space optical communication, since the speed of the polarization rotation which is generated during transmission is sufficiently lower than the trackable speed at the reception side, it is possible to receive the optical signal where modulation is performed in which the angular velocity of the polarization rotation is changed. In addition, in embodiment 2, the main signal demodulation section 332 is able to demodulate the main signal using the information as follows by obtaining information which is desired in demodulation of the main signal by detecting the laser channel ID at the start of communication with the transmission side communication device 201a.

For this reason, detection of the laser channel ID using the channel ID detecting section 333 may not be performed normally, and may only be performed at the start of communication. However, detection of the laser channel ID using the channel ID detecting section 333 may be performed as appropriate. For example, the reception side communication device 201b appropriately transmits an identifiable communication destination using the laser channel ID to the communication device 201c (refer to FIG. 2) except for the transmission side communication device 201a, or another management device.

Thereby, it is possible for the other communication device 201c or the other management device to manage the connection state of the entirety of the network of the communication system 200.

Modified Example of Embodiment 2

Next, a modified example of embodiment 2 will be described below. In the modified example of embodiment 2, a case in which the angular velocity of the polarization rotation of the light of a level n is detected will be described. In a case where a signal of level n is represented, the transmission side communication device 201a performs modulation in which the angular velocity of the polarization rotation of the light is changed according to the control information, and modulation in which the angular velocity of the polarization rotation of the light is changed to angular velocity $\omega 1, \omega 2, \ldots, \omega n$ according to the control information.

For example, the control channel encoder 401 (refer to FIG. 4) of the transmission side communication device 201a converts the received control channel bit row to a control channel modulation row which uses the angular velocity $\omega$ ($\omega 1, \omega 2, \omega 3, \ldots, \omega n$) of level n.

For example, the control channel encoder 401 converts the received control channel bit row to a control channel modulation row with reference to a conversion table of the control channel bit row and the control channel modulation row.

As an example of conversion, for example, it is possible to set (00→$\omega 1$), (01→$\omega 2$), (10→$\omega 3$), (11→$\omega 4$) when represented as (control channel bit row→control channel modulation row). Example of channel ID detecting section in a case where angular velocity of polarization rotation of level n is detected.

Figure 9:
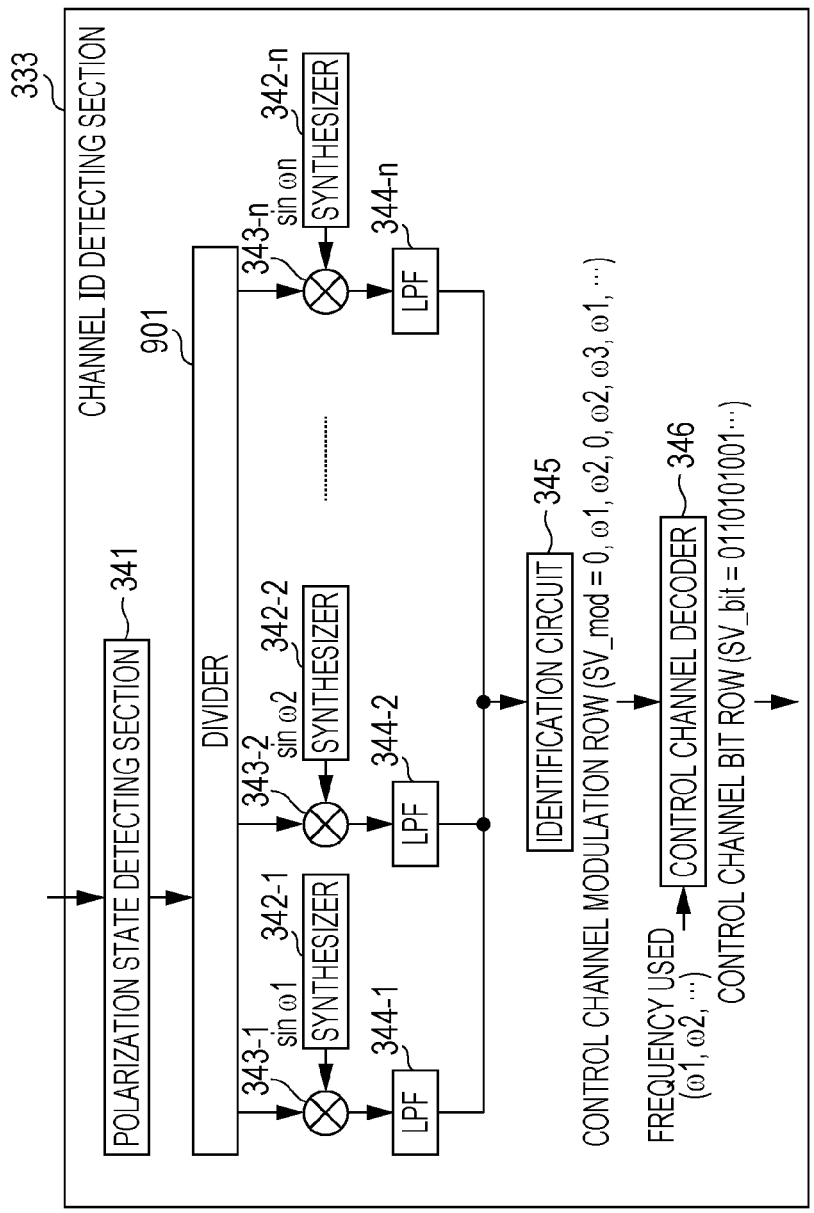
FIG. 9 is a view illustrating an example of a channel ID detecting section in a case where angular velocity of polarization rotation of level n is detected.

FIG. 9 is a view illustrating an example of the channel ID detecting section in a case where angular velocity of polarization rotation of level n is detected. As illustrated in FIG. 9, the channel ID detecting section 333 has the polarization state detecting section 341, a divider 901, and a plurality of synthesizers 342 (342-1, 342-2, ..., 342-n).

In addition, the channel ID detecting section 333 has a plurality of multiplying sections 343 (343-1, 343-2, ..., 343-n), and a plurality of LPF 344 (344-1, 344-2, ..., 344-n).

The polarization state detecting section 341 extracts the matrix element which indicates the pattern of the polarization state from the channel estimation result received from the channel estimation section 331, and extracts, for example, the main component (sin wave) with good quality where the amplitude has a large S/N ratio from within the extracted matrix element. Then, the polarization state detecting section 341 outputs the information which indicates the extracted sin wave to the divider 901. The divider 901 distributes information which indicates the sin wave that is received from the polarization state detecting section 341 to the plurality of multiplying sections 343 (343-1, 343-2, ..., 343-n). The synthesizer 342-1, for example, generates information which indicates sin $\omega 1$, and outputs the generated information to the multiplying section 343-1. The synthesizer 342-2, for example, generates information which indicates sin $\omega 2$, and outputs the generated information to the multiplying section 343-2.

The synthesizer 342-n, for example, generates information which indicates sin $\omega n$, and outputs the generated information to the multiplying section 343-n.

The multiplying section 343-1 multiplies the sin wave which indicates the information that is received from the divider 901 and the sin wave which indicates information which is received from the synthesizer 342-1. Then, the multiplying section 343-1 outputs a value obtained by the multiplying to the LPF 344-1. In the same manner, the multiplying section 343-n multiplies the sin wave which indicates the information which is received from the divider 901 and the sin wave which indicates information which is received from the synthesizer 342-n. Then, the multiplying section 343-n outputs a value obtained by the multiplying to the LPF 344-n. LPF 344-1, 344-2, ..., 344-n respectively cut a predetermined component.

The signal after the predetermined component is cut by the LPF 344-1, 344-2, ..., 344-n is output to the identification circuit 345. If at least one of the values which are indicated by the signal which is output by from the LPF 344-1, 344-2, ..., 344-n is equal to or more than the identification value, the identification circuit 345 indefinites $\omega k$ (k=1, 2, ..., n). In addition, if all of the values which are indicated by the signal which is output by from the LPF 344-1, 344-2, ..., 344-n are less than the identification value, the identification circuit 345 indefinites 0. In addition, if two or more of the values which are indicated by the signal which is output by from the LPF 344-1, 344-2, ..., 344-n are equal to or more than the identification value, the identification circuit 345 indefinites an error. The identification values are individually predetermined values according to rotation characteristics in each of the LPF 344-1, 344-2, ..., 344-n, but, for example, may be the same value. Then, the identification circuit 345 outputs the control channel modulation row that indicates the identified $\omega k$ or 0 to the control channel decoder 346.

The control channel decoder 346 obtains the control channel bit row which indicates the laser channel ID by converting the control channel modulation row which is received from the identification circuit 345 to a signal of 0 or 1. In the example which is illustrated in FIG. 9, for example, in a case where light, to which modulation in which the angular velocity of n is changed, is incident, the control information is received by synchronous detection which uses a clock with a speed corresponding to the angular velocity of n. However, in a case where light, to which modulation in which the angular velocity of n is changed, is incident, for example, it is also possible to receive the control information by synchronous detection which uses a clock with a speed corresponding to the angular velocity of n−1. In the modified example of embodiment 2, the reception side communication device 201b receives the control information by synchronous detection which uses a clock with a speed corresponding to the angular velocity $\omega 1, \omega 2, \ldots, \omega n$. It is possible to improve reception speed using synchronous detection in this manner. However, detection of the angular velocity $\omega$ in the reception side communication device 201b is not limited to a method using synchronous detection.

For example, it is also possible to carry out Fourier transformation on the signal which is output from the polarization state detecting section 341, and measure the power of the corresponding angular velocity $\omega$. According to such a method, it is possible to measure the angular velocity ($\omega 1, \omega 2, \ldots, \omega n$) of the polarization rotation of the light of a level n at one time. In addition, it is possible to suppress an increase of circuit size of the channel ID detecting section 333 in a case where the angular velocity of the polarization rotation of the light of a level n is detected. According to the modified example of embodiment 2, in free space optical communication, it is possible to improve the amount of transmission of the control information in which the main signal is superimposed. In addition, in the modified example of embodiment 2, since it is possible to modulate the angular velocity of the polarization rotation of the light of a level n using the control information and receive the angular velocity of the polarization rotation of the light of a level n, it is possible to improve the amount of transmission of the control information.

Embodiment 3

Next, embodiment 3 of the communication system 200 will be described.

In embodiment 2 described above, the angular velocity of the polarization rotation of the light is changed using the polarization controller 312, but in embodiment 3, a case where the angular velocity of the polarization rotation of the light is changed using a polarization rotator will be described. In embodiment 3, portions which are different from embodiments 1 and 2 will be described.

Configuration Example of Communication System According to Embodiment 3

Figure 10:
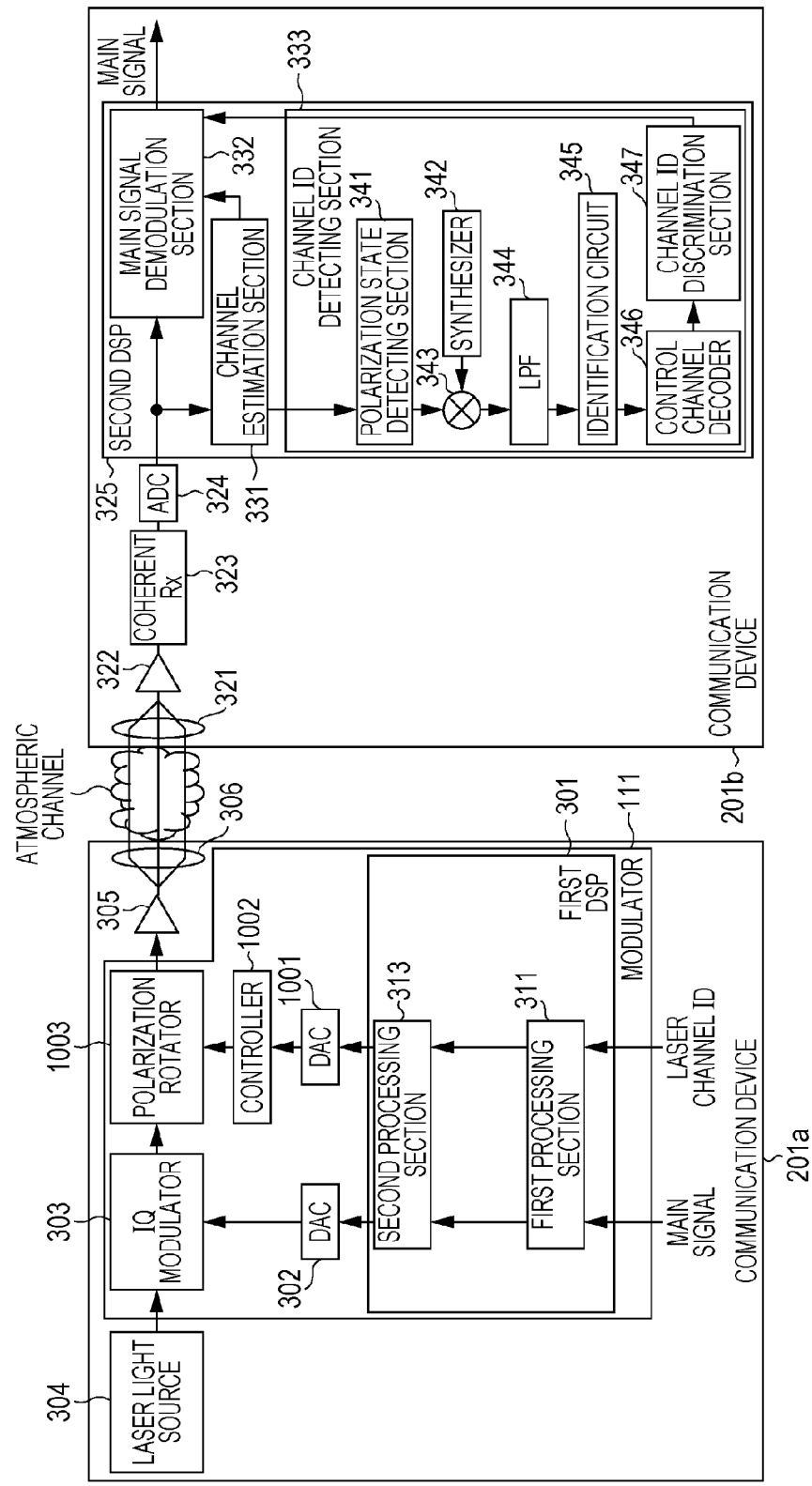
FIG. 10 is a view illustrating a configuration example of the communication system according to embodiment 3.

FIG. 10 is a view illustrating a configuration example of the communication system according to embodiment 3. As illustrated in FIG. 10, the transmission side communication device 201a has a DAC 1001, a controller 1002, and a polarization rotator 1003. The first processing section 311 generates a signal in order to perform modulation in which the phase is changed according to the received main signal, and the generated modulation signal is output to the second processing section 313. In addition, the first processing section 311 converts the control channel bit row which indicates the received laser channel ID to the control channel modulation row, and outputs the control channel modulation row which is obtained by the conversion to the second processing section 313.

The second processing section 313 multiplies the inverse characteristic of the DAC 302 which has incompleteness of respective analog signals with respect to each signal which is received from the first processing section 311. The second processing section 313 outputs the signal which is multiplied by the inverse characteristic to the DAC 302. The second processing section 313 outputs the signal, which indicates the control channel modulation row that is multiplied by the inverse characteristic, to the DAC 1001.

The DAC 302 converts a digital modulation signal which is received from the second processing section 313 to an analog signal. The DAC 302 outputs the analog modulation signal, which is obtained by the conversion, to the IQ modulator 303. The IQ modulator 303 generates the optical signal by modulating the light which is output from the laser light source 304 using the modulation signal for performing phase modulation which is received from the DAC 302. The IQ modulator 303 performs phase modulation according to the modulation signal which is received from the DAC 302. The IQ modulator 303 outputs the generated optical signal to the polarization rotator 1003. The DAC 1001 converts the digital signal, which indicates the control channel modulation row which is received from the second processing section 313, to an analog signal. The DAC 1001 outputs the signal, which indicates the analog control channel modulation row that is obtained by the conversion, to the controller 1002. The controller 1002 controls the polarization rotation of the polarization rotator 1003 using the analog signal which indicates the control channel modulation row which is received from the DAC 1001. The polarization rotator 1003 rotates the polarization of the optical signal which is received from the IQ modulator 303 by controlling according to the control channel modulation row by the controller 1002. Then, the polarization rotator 1003 outputs the optical signal which rotates the polarization to the amplifier 305.

Here, in embodiment 3, the polarization rotator 1003 is provided in a subsequent stage of the IQ modulator 303, but it is also possible to provide the polarization rotator 1003 in a preceding stage of the IQ modulator 303. The amplifier 305 amplifies the optical signal which is received from the polarization rotator 1003, and outputs the amplified optical signal to the lens 306. A first modulator in which the characteristic of the light which is different from the rotation speed is changed according to the main signal can be realized, for example, using the IQ modulator 303. In addition, a second modulator in which the rotation speed of the polarization rotator of the light is changed according to the control information can be realized, for example, using the polarization rotator 1003. According to embodiment 3, it is possible to transmit the optical signal in which the control information and the main signal are superimposed in free space optical communication by adding an optical component in order to perform modulation using the control information such as of the polarization rotator 1003 with respect to a configuration in which modulation is performed using the main signal.

Embodiment 4

Next, embodiment 4 will be described.

In embodiments 1 to 3, for example, single polarization is set in which the main signal is transmitted using only single polarization, but the case of embodiment 4 will be described in which, for example, dual polarization is set in which the main signal is transmitted using dual polarization. In embodiment 4, portions which are different from embodiments 1 to 3 will be described. Example of transmission device according to embodiment 4.

Figure 11:
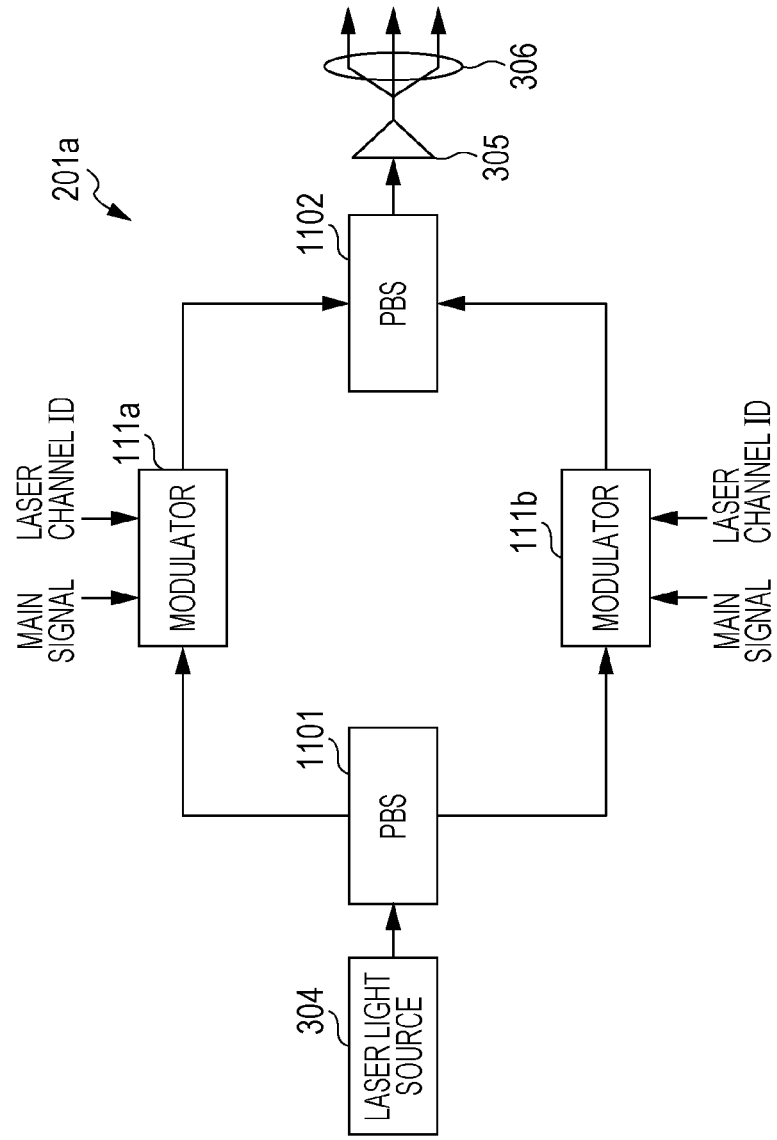
FIG. 11 is a view illustrating an example of a transmission device according to embodiment 4.

FIG. 11 is a view illustrating an example of a transmission device according to embodiment 4. As illustrated in FIG. 11, the transmission side communication device 201a has polarizing beam splitters (PBS) 1101 and 1102, and modulators 111a and 111b. The laser light source 304 outputs the generated laser light to the PBS 1101. The PBS 1101 separates laser light which is received from the laser light source 304 into first polarized waves and second polarized waves. The first polarized waves are, for example, vertical polarized waves. The second polarized waves are, for example, horizontal polarized waves. The PBS 1101 outputs the separated light to the modulator 111a and the modulator 111b. The modulators 111a and 111b are each configured in the same manner as the modulator 111 which is illustrated in FIG. 3. The main signal and the laser channel ID are input to the modulator 111a. The modulator 111a generates an optical signal by modulating light which is received from the PBS 1101 according to the main signal and the laser channel ID. For example, the modulator 111a performs modulation in which the angular velocity of the polarization rotation of the light and the phase of the light are changed. Then, the modulator 111a outputs the generated optical signal to the PBS 1102.

The main signal and the laser channel ID are input to the modulator 111b. The modulator 111b generates an optical signal by modulating light which is received from the PBS 1101 according to the main signal and the laser channel ID. For example, the modulator 111b performs modulation in which the angular velocity of the polarization rotation of the light and the phase of the light are changed. Then, the modulator 111*b* outputs the generated optical signal to the PBS 1102. The PBS 1102 combines the signal which is received from the modulator 111*a* and the optical signal which is received from the modulator 111*b*. Then, the PBS 1102 outputs the combined optical signal to the amplifier 305. The amplifier 305 amplifies the optical signal which is received from the PBS 1102, and outputs the amplified optical signal to the lens 306. The lens 306 emits the optical signal which is output from the amplifier 305 to the free space set in a state of being a collimator.

In the example which is illustrated in FIG. 11, a case is described where modulation in which the angular velocity of the polarization rotation of the light is changed is performed by the modulator 111*a* and the modulator 111*b*, but only one of the modulator 111*a* or the modulator 111*b* may be used. For example, in a case where the modulation method of the main signal is the same in the modulator 111*a* and the modulator 111*b*, modulation may be performed in which the angular velocity of the polarization rotation of the light is changed by inputting the laser channel ID to only one of the modulator 111*a* or the modulator 111*b*. In addition, the other one of the modulator 111*a* or the modulator 111*b* may perform modulation according to the main signal without performing the modulation in which the angular velocity of the polarization rotation of the light is changed. That is, it is sufficient if it is possible for the transmission side communication device 201*a* to emit the obtained light by polarization multiplexing the light of the first polarized waves which are modulated by one of the modulator 111*a* or the modulator 111*b*, and the second polarized waves which are modulated according to the main signal. Example of receiving device according to embodiment 4.

Figure 12:
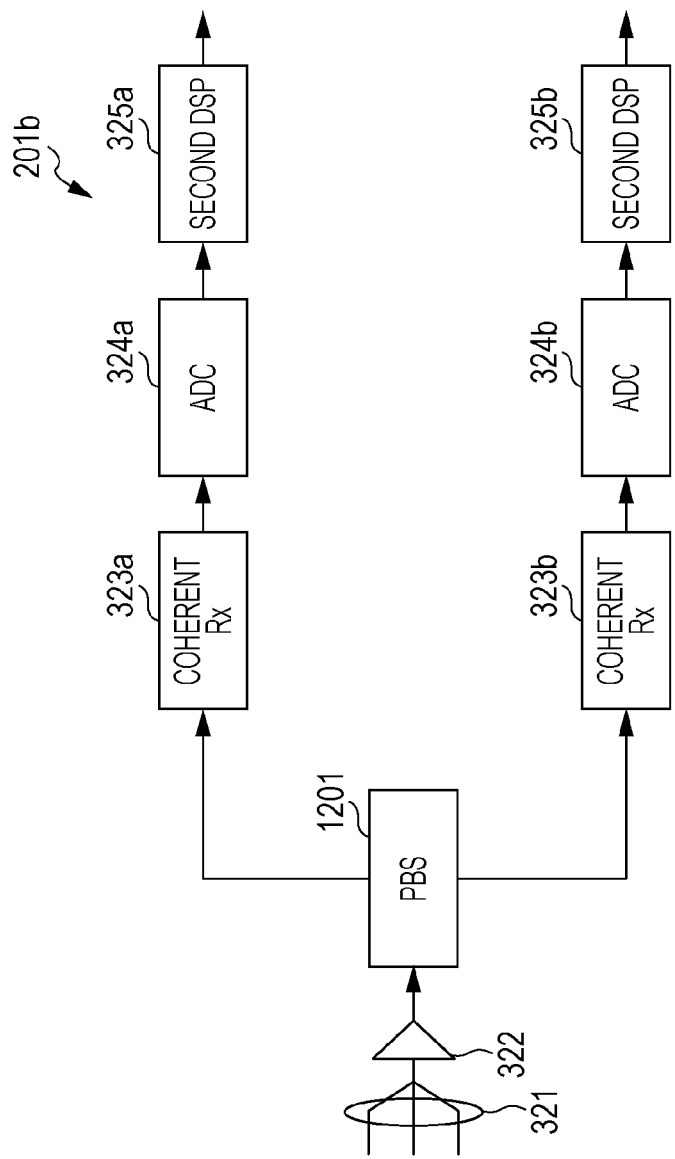
FIG. 12 is a view illustrating an example of a reception device according to embodiment 4.

FIG. 12 is a view illustrating an example of a receiving device according to embodiment 4. As illustrated in FIG. 12, the reception side communication device 201*b* has a PBS 1201, coherent receivers 323*a* and 323*b*, ADC 324*a* and 324*b*, and second DSP 325*a* and 325*b*. The amplifier 322 amplifies the optical signal which is received from the lens 321, and outputs the amplified optical signal to the PBS 1201. The PBS 1201 separates the optical signal which is received from the amplifier 322 into vertical polarized waves and horizontal polarized waves. The PBS 1201 is output to the coherent receiver 323*a* and the coherent receiver 323*b*. The coherent receiver 323*a* photoelectrically converts the optical signal which is received from the PBS 1201 to the electrical signal according to the intensity of the received optical signal. Then, the coherent receiver 323*a* outputs the electrical signal which is obtained by the photoelectric conversion to the ADC 324*a*.

The ADC 324*a* converts the analog signal which is received from the coherent receiver 323*a* to a digital signal. The ADC 324*a* outputs the digital signal which is obtained by the conversion to the second DSP 325*a*. The second DSP 325*a* has the same configuration as the second DSP 325 which is illustrated in FIG. 3. The second DSP 325*a* demodulates the control information by detecting the angular velocity of the polarization rotation of the signal which is received from the ADC 324*a*. The second DSP 325*a* performs demodulation or the like of the main signal using information which is desired in demodulation or the like of the main signal which is specified from the demodulated control information. The second DSP 325*a* outputs the main signal on which demodulation or the like is performed in a preceding stage.

The coherent receiver 323*b* photoelectrically converts the optical signal which is received from the PBS 1201 to the electrical signal according to the intensity of the received optical signal. Then, the coherent receiver 323*b* outputs the electrical signal which is obtained by the photoelectric conversion to the ADC 324*b*. The ADC 324*b* converts the analog signal which is received from the coherent receiver 323*b* to a digital signal. The ADC 324*b* outputs the digital signal which is obtained by conversion to the second DSP 325*b*. The second DSP 325*b* has the same configuration as the second DSP 325 which is illustrated in FIG. 3. The second DSP 325*b* demodulates the control information by detecting the angular velocity of the polarization rotation of the signal which is received from the ADC 324*b*. The second DSP 325*b* performs demodulation or the like of the main signal using information which is desired in demodulation or the like of the main signal which is specified from the demodulated control information. The second DSP 325*b* outputs the main signal on which demodulation or the like is performed in a preceding stage.

Here, in the example which is illustrated in FIG. 12, the second DSP 325*a* and the second DSP 325*b* are provided separately, but a common DSP may be provided. For example, in a case where only one of the modulator 111*a* or the modulator 111*b* which are illustrated in FIG. 11 is configured to perform modulation in which the angular velocity of the polarization rotation of the light is changed, modulation of the control information may be performed by one of the second DSP 325*a* or the second DSP 325*b*. In this case, it is sufficient if the demodulated control information is transmitted from one of the second DSP 325*a* or the second DSP 325*b*, which performs the demodulation, to the other.

Alternatively, one of the second DSP 325*a* or the second DSP 325*b*, which performs the demodulation, may specify the information which is desired in demodulation or the like of the main signal based on the demodulated control information, and transmit the specified information to the other. As described above, according to embodiment 4, in free space optical communication, it is possible to transmit the optical signal in which the control information and the main signal are superimposed using a polarization multiplexing method. According to an aspect of the embodiments, in free space optical communication, it is possible to transmit data and control information by superimposing with further precision without adding an optical component.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus which transmits data and control information which indicates at least one of a demodulation method and a decoding method of the data using an optical signal, the apparatus comprising:

a modulator configured to perform modulation in which a rate of change of a polarization state of light is changed according to the control information, and modulation in which a characteristic of light which is different from the rate of change of the polarization state is changed in accordance with the data; and an emitting section configured to emit light, on which modulation is performed using the modulator, to another communication apparatus via a free space.

2. The apparatus according to claim 1, wherein the modulator includes an electrical circuit which generates an electrical signal for modulation based on the data and the control information, and an inphase/quadrature (IQ) modulator which changes the rate of change and the characteristic in accordance with the electrical signal.

3. The apparatus according to claim 1, wherein the modulator includes a first modulator in which the characteristic is changed in accordance with the data, and a second modulator in which the rate of change is changed in accordance with the control information.

4. The apparatus according to claim 1, wherein the modulator modulates light of first polarized waves, and
the emitting section emits light obtained by polarization multiplexing the light which is modulated by the modulator, and light which is modulated in accordance with data in second polarized waves which are different from the first polarized waves.

5. The apparatus according to claim 1, wherein the characteristic is a phase or the polarization state, and a modulation frequency in which the rate of change is changed is lower than a modulation frequency in which the characteristic is changed.

6. An apparatus, comprising:
an incident section to which light is incident via a free space, the light being emitted from a transmission device which transmits data and control information which indicates at least one of a demodulation method and a decoding method of the data using an optical signal by performing modulation in which a rate of change of a polarization state of the light is changed in accordance with the control information, and modulation in which a characteristic of the light which is different from the rate of change of the polarization state is changed in accordance with the data;
a conversion section which carries out photoelectric conversion on the light which is incident to the incident section;

a first receiving section which receives the control information by detecting the rate of change of the polarization state of the light which is incident to the incident section based on the electrical signal which is obtained by photoelectric conversion in the conversion section; and
a second receiving section which receives the data based on the electrical signal and the control information which is received by the first receiving section.

7. The apparatus according to claim 6,
wherein the modulation in which the rate of change is changed in accordance with the control information is modulation in which the rate of change is changed to a plurality of rates of change in accordance with the control information, and
the first receiving section receives the control information by synchronous detection which uses a clock with a speed corresponding to a rate of change which is included in the plurality of rates of change.

8. A communication method comprising:
causing a transmission apparatus which transmits data and control information which indicates at least one of a demodulation method and a decoding method of the data using an optical signal to perform modulation in which a rate of change of a polarization state of light is changed in accordance with the control information, and modulation in which a characteristic of light which is different from the rate of change of the polarization state is changed in accordance with the data; and
causing the transmission apparatus to emit the light on which modulation is performed to a receiving apparatus via a free space.

9. The communication method according to claim 8,
wherein the receiving apparatus performs photoelectric conversion on light which is emitted by the transmission apparatus and incident to the receiving apparatus via a free space,
the receiving apparatus receives the control information by detecting the rate of change of the polarization state of the incident light based on an electrical signal that is obtained by the photoelectric conversion, and
the receiving apparatus receives the data based on the electrical signal and the received control information.

* * * * *